(12) United States Patent
Lopez

(10) Patent No.: US 9,694,997 B2
(45) Date of Patent: Jul. 4, 2017

(54) DELIVERY RAMP WITH AN ADJUSTABLE, ROTATABLE PIVOT

(71) Applicant: Michael Lopez, Brooklyn Park, MN (US)

(72) Inventor: Michael Lopez, Brooklyn Park, MN (US)

( * ) Notice: Subject to any disclaimer, the term of this patent is extended or adjusted under 35 U.S.C. 154(b) by 23 days.

(21) Appl. No.: 14/990,549

(22) Filed: Jan. 7, 2016

(65) Prior Publication Data

US 2017/0022017 A1 Jan. 26, 2017

Related U.S. Application Data

(60) Provisional application No. 62/196,448, filed on Jul. 24, 2015.

(51) Int. Cl.
| | | |
|---|---|---|
| B65F 3/00 | (2006.01) | |
| B65G 69/30 | (2006.01) | |
| B60P 1/43 | (2006.01) | |

(52) U.S. Cl.
CPC ............... *B65G 69/30* (2013.01); *B60P 1/43* (2013.01)

(58) Field of Classification Search
USPC .......................................... 414/537; 14/71.1
See application file for complete search history.

(56) References Cited

U.S. PATENT DOCUMENTS

| | | |
|---|---|---|
| 1,018,407 A | 2/1912 | Cameron |
| 3,019,917 A | 2/1962 | Ajero |
| 3,086,669 A | 4/1963 | Rogers |
| 3,185,109 A | 5/1965 | Mengel |
| 4,110,859 A | 9/1978 | Lichti |
| 4,368,553 A | 1/1983 | Perry |
| 4,425,069 A | 1/1984 | Saur et al. |
| 4,796,537 A * | 1/1989 | Besser ........................... 104/37 |

(Continued)

FOREIGN PATENT DOCUMENTS

| | | |
|---|---|---|
| ES | 2208029 A1 | 6/2004 |
| JP | H07251791 A | 10/1995 |

OTHER PUBLICATIONS

"Classic". Little Giant Ladder System. May 14, 2014. Retrieved on Oct. 17, 2016. https://web.archive.org/web/20150514182513/https://www.littlegiantladder.com/skin/frontend/netmedia/lgl2014/images/manuals/ladders/classic_manual.pdf>.

(Continued)

*Primary Examiner* — Saul Rodriguez
*Assistant Examiner* — Willie Berry, Jr.
(74) *Attorney, Agent, or Firm* — Patterson Thuente Pedersen, P.A.

(57) ABSTRACT

A truck ramp including a first ramp element, second ramp element and pivoting structure located between the first and second ramp elements. The first ramp element is coupled to the truck at one end and at the other end, a hinge. The second ramp element is hinged at one end and at the other end interfaces with the ground or other surface. Between the first and second ramp elements is a pivoting structure comprised of a first component that is mechanically coupled to the first ramp element at the first hinged end and a second component that is mechanically coupled to the second ramp element at the hinged end. The first component and the second component are rotatable about an axis orthogonal to the first and second ramp element hinges.

19 Claims, 12 Drawing Sheets

(56) References Cited

U.S. PATENT DOCUMENTS

| | | | |
|---|---|---|---|
| 4,813,839 | A | 3/1989 | Compton |
| 5,004,188 | A | 4/1991 | Donneky et al. |
| 6,119,634 | A | 9/2000 | Myrick |
| 6,487,742 | B1 | 12/2002 | Beazer et al. |
| 6,536,064 | B1 | 3/2003 | Swink et al. |
| 6,923,140 | B1 | 8/2005 | Cook |
| 7,143,519 | B2 | 12/2006 | Jackson |
| 7,367,253 | B2 | 5/2008 | Romo et al. |
| 7,690,878 | B2 | 4/2010 | Aaron |
| 7,832,975 | B1 * | 11/2010 | Mitchell ................ 414/537 |
| 8,196,729 | B2 | 6/2012 | Gausman et al. |
| 8,266,750 | B2 | 9/2012 | Peterson |
| 8,402,584 | B2 | 3/2013 | Westermark et al. |
| 8,413,280 | B2 | 4/2013 | Goin et al. |
| 8,832,892 | B2 | 9/2014 | Goin et al. |
| 2009/0230642 | A1 | 9/2009 | Thomas |
| 2012/0204363 | A1 | 8/2012 | Westermark et al. |
| 2015/0056049 | A1 | 2/2015 | Honigsberg |

OTHER PUBLICATIONS

"Pivot Ramp Patent Pending". Michael Lopez Jr. Nov. 12, 2015. Retrieved from: https://web.archive.org/web/20151112234018/ https://www.kickstarter.com/projects/1784801597/pivot-ramp-patent-pending>.

"RYR-37-22 Steel Yard Ramp" DiscountRamps.com. Aug. 22, 2014. Retrieved from: https://www.youtube.com/watch?v=-xk8qFYqNhU>.

International Search Report and Written Opinion, for PCT Application No. PCT/US2016/043882, dated Oct. 28, 2016, 22 pages.

\* cited by examiner

DELIVERY RAMP WITH AN ADJUSTABLE, ROTATABLE PIVOT

CROSS-REFERENCE TO RELATED APPLICATION

This application claims the benefit of U.S. Provisional Patent App. Ser. No. 62/196,448 filed Jul. 24, 2015, the contents of which are hereby incorporated by reference.

TECHNICAL FIELD

The embodiments described herein relate generally to both non-permanently installed loading ramps to be used with all size trucks or any hauling equipment as well as loading ramps that are permanently mounted on a vehicle or other structure. The embodiments described herein include ramps that are used for conveying material between disassociated bases at various distances and are mounted under the loading floor of a vehicle or other structure.

BACKGROUND

Truck delivery ramps are an essential element to any logistics department of any company that produces a physical product. Truck delivery ramps are also critical to the operations of delivery service and moving companies. The process of loading and unloading product from trucks plays a crucial role in delivery efficiency and employee safety. During the course of a delivery, a driver, using a typical truck delivery ramp, will park on the street and unload the truck, typically from the rear. Generally a ramp will be utilized to traverse the truck bed height and the ground. The ramp will be placed, at one end, on the bed of the truck and, at the other end, on the ground. Conventional truck delivery ramps are straight sections enabling the user to unload cargo directly out the back of the truck. A problem arises when the truck parks along the street and a curb or other obstruction is present. Currently, unloading or loading a truck either involves unsafely angling the ramp to traverse the curb, or having to carry the cargo a great distance until a crosswalk or driveway arises. Traversing the curb by angling a delivery ramp presents serious safety issues for the person loading or unloading the truck. A ramp that is designed to be used in a substantially rear-facing unloading capacity will not adequately ensure safety for the user when adjusted or angled laterally. Occupational health hazards aside, there are other practical issues that arise from this particular misuse of ramps including accelerated equipment wear and tear, traffic obstructions and product damage.

Further, the use of conventional straight ramps can be inefficient. This inefficiency is primarily caused by lengthened loading and unloading times. Loading and unloading time becomes a meaningful factor in a business's logistics and is often incorporated into the production cycle. It is therefore of appreciable interest to many businesses to keep loading and unloading time as minimal as possible. Conventional truck ramps lack versatility and when less than ideal loading or unloading conditions arise, this low versatility can require substantial time resources to overcome. For instance, if a truck pulls up to its destination along a curbed road the truck drivers have to spend time creating a safe and manageable alternative unloading path in order to deliver the product. The alternative path taken is inevitably longer or takes more time than unloading the truck directly. For a business that utilizes truck delivery or pick-up, this lost time is a predictable drain on that business's efficiency.

Accordingly, there is a need in the industry for a truck ramp that can safely traverse curbs and other varying terrain not directly rear of the truck and thereby increasing efficiency, reducing wear and tear, and reducing traffic obstructions and product damage.

SUMMARY

According to embodiments, an improved truck ramp enables a vast increase in ramp maneuverability while improving safety, efficiency and limiting traffic obstructions. By incorporating a pivot component into the ramp, the ramp facilitates loading and unloading at curbs, small unloading spaces, varied terrain, and other difficult loading and unloading scenarios.

In an embodiment, a device for use with a truck includes a pivoting structure. The pivoting structure has a stationary segment having a first end configured to be mechanically coupled to the truck, and a rotation segment mechanically coupled to the stationary segment at a second end of the stationary segment and rotatable about each the stationary segment at a first axis. A ramp having a coupler couples the first end of the ramp and the rotation segment, the coupler having a second axis of rotation that is substantially orthogonal to the first axis.

In other embodiments, multiple ramp segments can be used. For example, in an embodiment, a device that includes a ramp for use with a truck comprises a first ramp element having a first coupler arranged at a first end of the first ramp element wherein the first coupler is configured to be coupleable to the truck. A hinge can be arranged at a second end of the first ramp element, wherein the second end is opposite the first ramp element from the first end, the hinge having a first axis of rotation. A second ramp element includes a third coupler arranged at a first end of the second ramp element, the third coupler having a second axis of rotation that is substantially parallel to the first axis of rotation. A second end of the second ramp element is opposite the first end of the second ramp element and is configured to be supported by adjacent surface. The device further includes a pivoting structure having a stationary segment mechanically coupled to the first ramp element at the hinge, and a rotation segment mechanically coupled to the second ramp element at the third coupler. The stationary segment and the rotation segment are rotatable about an axis orthogonal to the first axis.

In embodiments, the ramp and pivoting structures can be operably coupled to a truck to remedy the aforementioned deficiencies of conventional truck ramp systems.

The above summary of the invention is not intended to describe each illustrated embodiment or every implementation of the present invention. The detailed description and claims that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
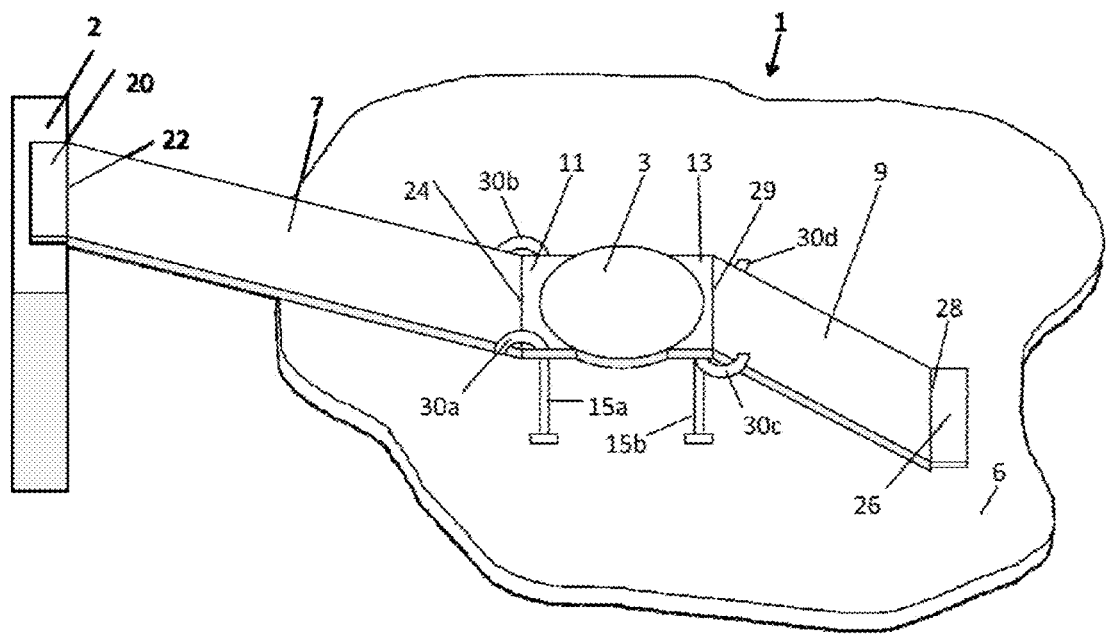
FIG. 1 is a perspective view of a pivoting ramp, according to an embodiment.

While embodiments are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the appended claims.

DETAILED DESCRIPTION OF THE DRAWINGS

FIG. 1 shows an embodiment of a pivoting delivery ramp 1 that extends from a truck loading bed 2 to a pivot structure 3, then to a unloading surface 6. An upper ramp portion 7 and a lower ramp portion 9 couple truck loading bed 2 to the pivot structure 3, and the pivot structure 3 to the unloading surface 6, respectively. Upper ramp portion 7 couples to pivot structure 3 at a stationary segment 11. Opposite stationary segment 11 of the pivot structure 3 is a rotation segment 13 to which the lower ramp portion 9 is coupled. Lower ramp portion 9 rests on the unloading surface 6 at the opposite end of the rotation segment 13 attachment.

Figure 2:
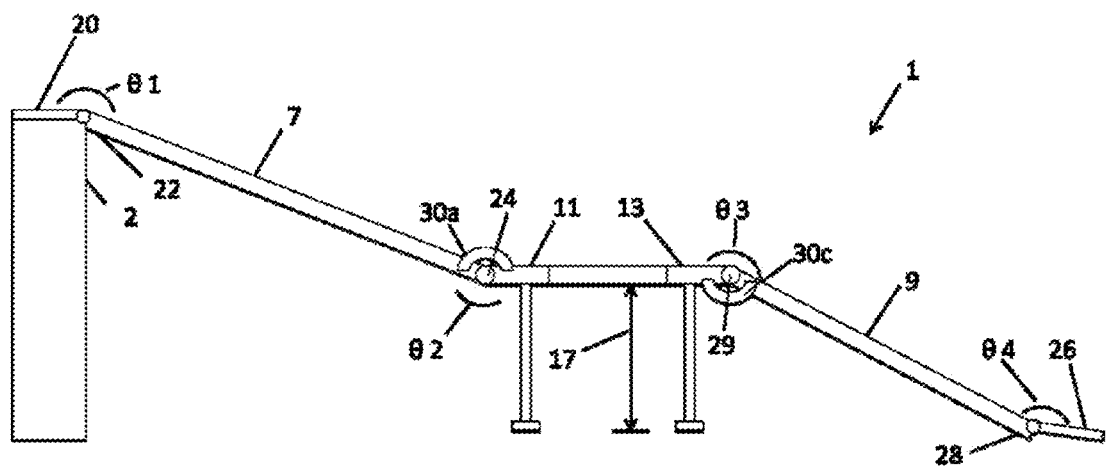
FIG. 2 is an elevation view of a pivoting ramp, according to an embodiment.

In this embodiment, pivot structure 3 is supported by support structures 15a-15d (15c and 15d not shown). Variable length support structures 15a-15d are attached to the underside of the pivot structure 3 and extend downward to the unloading surface 6 or other supporting surface below the pivoting structure 3. The variable length support structures 15a-15d can accommodate various terrains inherent in unloading surface 6 as well as various support heights 17, as shown in FIG. 2. Variable length support structures 15a and 15c attach to stationary segment 11 and variable length support structures 15b and 15d attach to rotation segment 13. The variable length support structures 15a-15d attach to rotation segment 13 and stationary segment 11 such that pivot structure 3 is supported by variable length support structures 15a-15d. The variable length support structures 15a-15d can either detach or fold flat in a compact manner when not in use, in embodiments.

Upper ramp portion 7 also includes a truck engagement lip 20, in embodiments as shown in FIG. 2. Truck engagement lip 20 provides a graduated transition plane between upper ramp portion 7 and truck loading bed 2 as well as establishes structural fixation from upper ramp portion 7 to truck loading bed 2. Truck engagement lip 20 couples to upper ramp portion 7 via lip hinge 22, which provides angular freedom identified as truck lip angle θ1, which represents the angle between truck engagement lip 20 and upper ramp portion 7. The upper ramp portion 7 further couples to the stationary segment 11 via upper pivot hinge 24 to provide angular freedom identified as upper pivot angle θ2, which represents the angle between upper ramp portion 7 and stationary segment 11. In this embodiment, truck lip angle θ1 and upper pivot angle θ2 are equal to each other when both truck loading bed 2 and pivot structure 3 are flat. The lower ramp portion 9 further couples to the rotation segment 13 via lower pivot hinge 29 to provide angular freedom identified as lower pivot angle θ3, which represents the angle between lower ramp portion 9 and rotation segment 13. Lower ramp portion 9 also includes floor lip 26. Floor lip 26 similarly couples to lower ramp portion 9 via lower lip hinge 28, which provides angular freedom identified as floor lip angle θ4, which represents the angle between floor lip 26 and lower ramp portion 9. Lip hinge 22, pivot hinge 24, lower lip hinge 28, and lower pivot hinge 29 allow pivoting of delivery ramp 1 to adjust to various truck loading bed 2 heights while maintaining a desired slope at each ramp segment. Specifically, it can be advantageous for pivot structure 3 to operate on a substantially flat plane to ensure ramp stability and user safety. The freedom of angular motion of truck lip angle θ1, upper pivot angle θ2, lower pivot angle θ3, and floor lip angle θ4 enable pivot structure 3 to operate on a generally flat plane assuming that both truck loading bed 2 and unloading surface 6 are also on a generally flat plane.

Angle locks 30a and 30b, shown in FIG. 1, enable upper pivot angle θ2 to be fixed for added stability. In embodiments, angle locks 30a and 30b are structurally fixed to either end of stationary segment 11. Angle locks 30a and 30b engage with upper ramp portion 7 at various locations depending on the upper pivot angle θ2. Angle locks 30c and 30d, of FIG. 1, enable lower pivot angle θ3 to be fixed for added stability. Angle locks 30c and 30d are structurally fixed to either end of rotation segment 13, in embodiments. Angle locks 30c and 30d engage with lower ramp portion 9 at various locations depending on the preferred lower pivot angle θ3.

Figure 3:
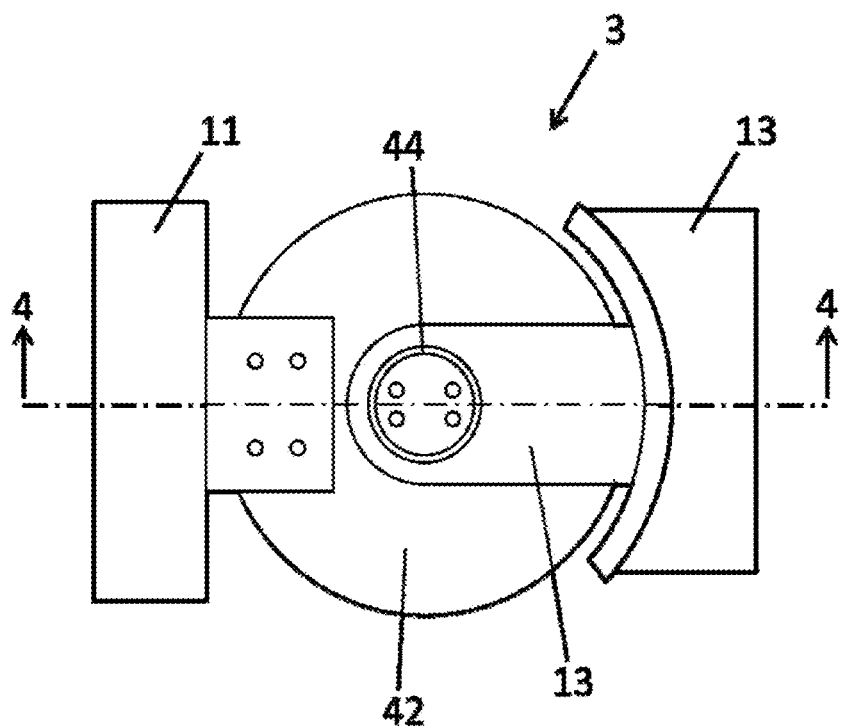
FIG. 3 is a top plan view of the pivoting section of a pivoting ramp with the upper symmetric disk removed, according to an embodiment.
Figure 4:
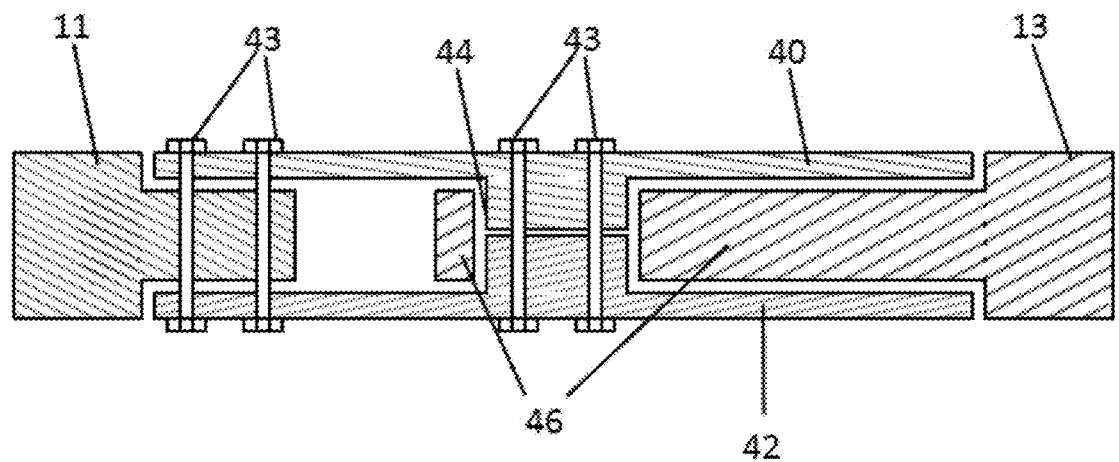
FIG. 4 is a cross section view of the pivoting section of a pivoting ramp, according to an embodiment.

The pivot structure 3 shown in FIG. 3 and FIG. 4 comprises the intersection of the rotation segment 13 and the stationary segment 11. Stationary segment 11 includes an upper symmetric disk 40 (not shown in FIG. 3) and a lower symmetric disk 42. The upper symmetric disk 40 and the lower symmetric disk 42 are fixed together by bolts 43 or weldment such that inner spool wall 44 is formed. Prior to fixation of upper symmetric disk 40 and lower symmetric disk 42, pivot extrusion 46 of rotation segment 13 is placed at the intersection of upper symmetric disk 40 and lower symmetric disk 42 such that pivot extrusion 46 is free to rotate around the inner spool wall 44. Prior to fixation of upper symmetric disk 40 and lower symmetric disk 42, stationary segment 11 is placed between upper symmetric disk 40 and the lower symmetric disk 42 and fixed together by bolts 43 or weldment. In this embodiment rotation segment 13 and stationary segment 11 concentrically rotate about each other. This embodiment is a simple and durable pivoting platform that is easy to manufacture and requires low maintenance.

Figure 5:
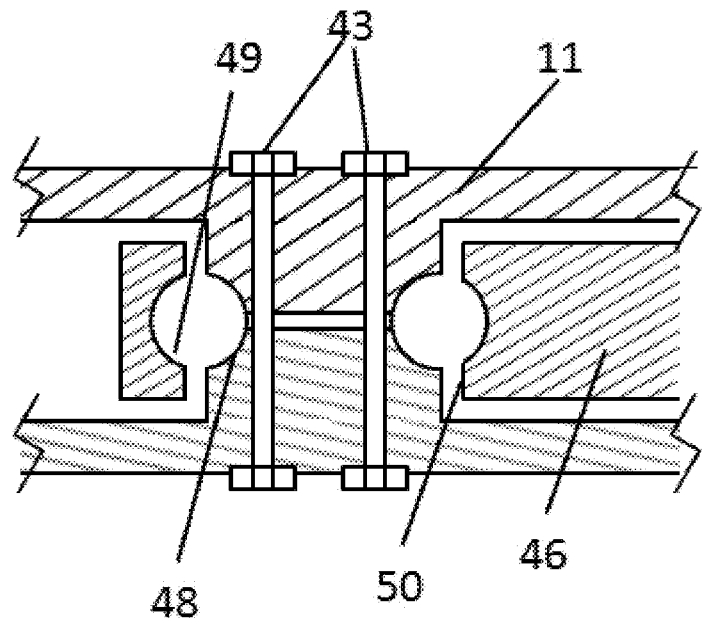
FIG. 5 is a cross section view of the pivoting section of a pivoting ramp with an included bearing race feature, according to an embodiment.

In a variant embodiment shown in FIG. 5, upper symmetric disk 40 and lower symmetric disk 42 meet to create inner bearing race 48. Inner concentric wall 50 of pivot extrusion 46 then serves as outer bearing race 49. The inner bearing race 48 and the inner concentric wall 50 together hold ball bearing components (not shown in this view) and therefore rotate in relation to each other. Bearing race 48 may also form a flat surface creating the inner drum (not shown in this view) of a plain bearing. In this embodiment rotation segment 13 and stationary segment 11 concentrically rotate about each other. This pivot structure 3 embodiment can provide easier operation due to the lowered friction forces of bearing enabled rotation.

Figure 6:
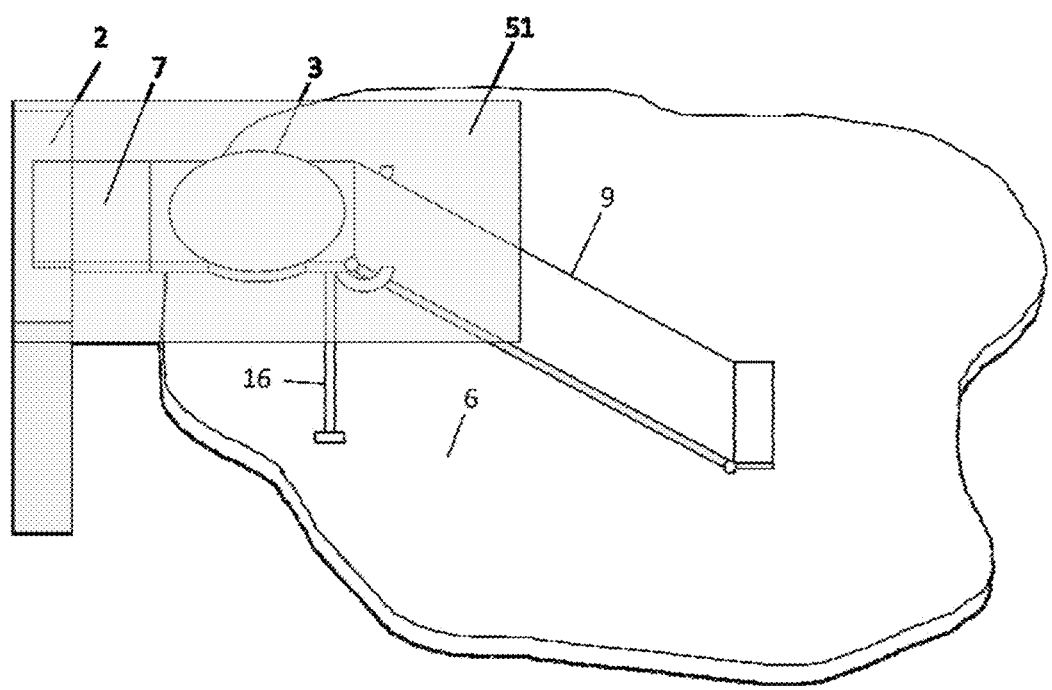
FIG. 6 is a perspective view of an alternative pivoting ramp, according to an embodiment.

In the embodiment shown in FIG. 6, upper ramp portion 7 extends directly from the truck loading bed 2 to pivot structure 3 maintaining unified plane 51. In an alternative embodiment, upper ramp portion 7 and truck engagement lip 20 are integrated into stationary segment 11 to form one rigid element. Unified plane 51 lies in the same plane as truck loading bed 2. Lower ramp portion 9 then extends from the truck loading bed 2 directly to the unloading surface 6 within unified plane 51. Variable length support structure 16 attaches to pivot structure 3 to provide cantilever support. In alternative embodiments, two or more support structures could be used. This embodiment offers advantages relative to the dual stage pivoting ramp shown in FIG. 1 and FIG. 2 in both ease of storage and performance. Incorporating both upper ramp portion 7 and pivot structure 3 into unified plane 51 creates one continuous ramp descent, embodied by lower ramp portion 9, which is advantageous for maintaining stability and momentum of heavier loads. Further, this improved embodiment eliminates the need for lip hinge 22, upper pivot hinge 24, and angle locks 30a and 30b because of the plane unity among upper ramp portion 7, pivot structure 3, and truck loading bed 2.

Figure 7:
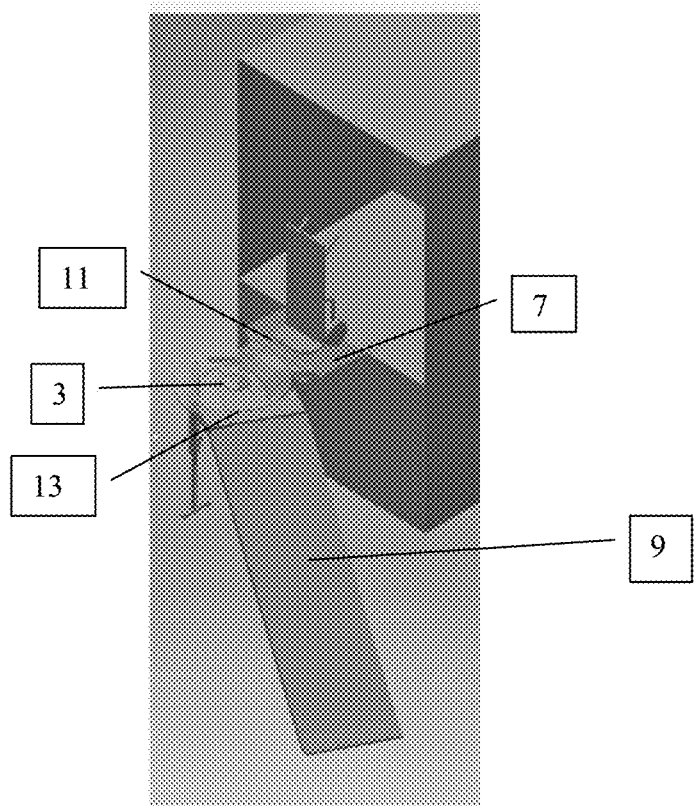
FIG. 7 is a perspective view of an alternative pivoting ramp in a rotated position, according to an embodiment.

FIG. 7 shows the same embodiment of FIG. 6, but as shown in FIG. 7, pivoting delivery ramp 1 is arranged in such a way that rotation segments 13 and stationary segments 11 are rotated about 110 degrees to each other. FIG. 7 shows the adjustability of pivoting delivery ramp 1, and virtually any degree of rotation, in either direction, is possible.

In alternative embodiments, the systems described with respect to FIGS. 1-7 could be used to connect a variety of disassociated bases, and not just to connect a truck bed to the ground by a ramp. For example, using embodiments described herein, ramp systems could be used to connect loading docks, automobiles, helicopters, boats and ships, rail cars, shelving, or any other two bases or platforms that may be spaced apart vertically and/or horizontally. Such interconnections can be used for a variety of purposes, such as transporting cargo or people between any two such bases or platforms. The various alternatives and improvements described with respect to the following figures could also be implemented on such designs, although for convenience and clarity the bases described herein are described as truck beds. It should be understood that, with reference to all the embodiments described herein, the truck bed and/or the ground could be any of these types of base or platform.

Figure 8:
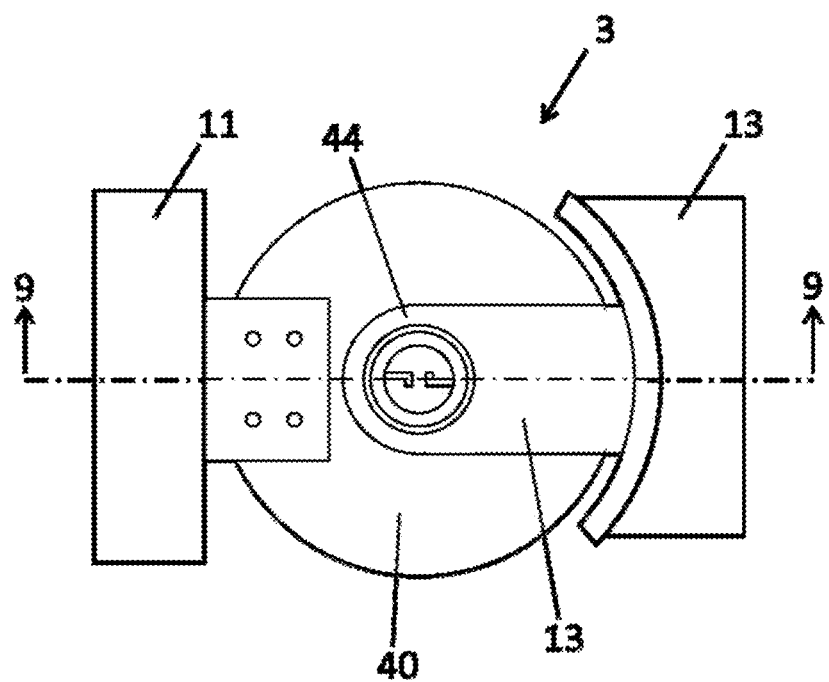
FIG. 8 is a bottom plan view of the pivoting section locking mechanism with lower symmetric disk removed, according to an embodiment.
Figure 9A:
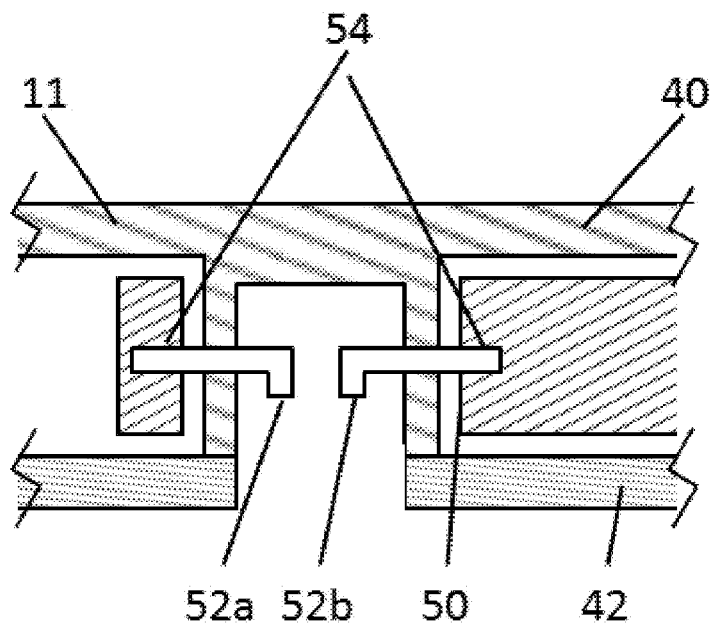
FIGS. 9A and 9B are cross-sectional views of alternative pivoting section locking mechanisms, according to an embodiment.

FIG. 8 and FIG. 9A show an embodiment of pivot structure 3 that enables rotational locking of the rotation segment 13 and stationary segment 11. Here, inner concentric wall 50 has multiple holes 54 associated with various desired lock positions. Upper symmetric disk 40 and lower symmetric disk 42 (not shown in FIG. 8) then house lock rod 52a and lock rod 52b and allow lock rod 52a and lock rod 52b to engage with the various holes of inner concentric wall 50 effectively locking pivoting delivery ramp 1 in a desired orientation. This locking embodiment of pivot structure 3 can provide greater structural integrity and safety while maintaining the advantageous axial rotation of non-locking embodiments of pivot structure 3.

Figure 9B:
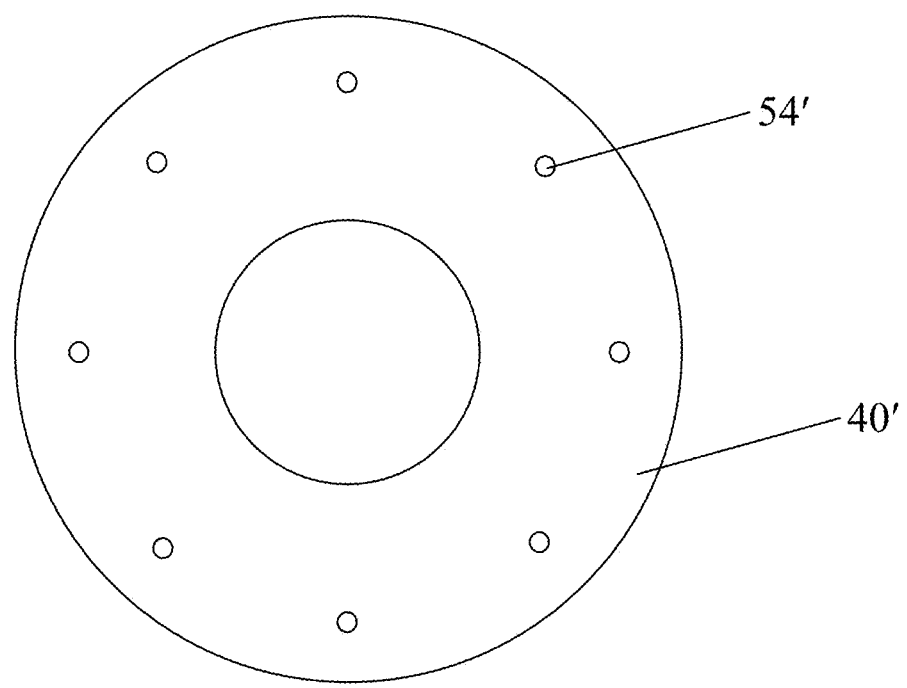

FIG. 9B shows an alternative embodiment of a disc 40' in which holes 54' are positioned radially about the disc 40'. As such, a similar lock rod or set of lock rods can be arranged on a stationary segment (not shown) that extend into one or more of the holes 54' to prevent rotation, from a different angle than previously shown in FIG. 9A. This can be beneficial in embodiments where a user can reach underneath the pivoting structure and pull a pin downwards away from the disc 40' to unlock and allow rotation, and release into any of the holes 54' to re-lock the disc 40'. In alternative embodiments, there could be relatively more or feser holes 54' spaced about disc 40', and the holes 54' can be either symmetrically or asymmetrically spaced about the disc 40'. In still further embodiments, such as those in which particularly large loads are expected, it may be desirable to combine the radially-extending pin locking structures shown in FIG. 9A with the longitudinally-extending pin locking structures shown in FIG. 9B.

Figure 10:
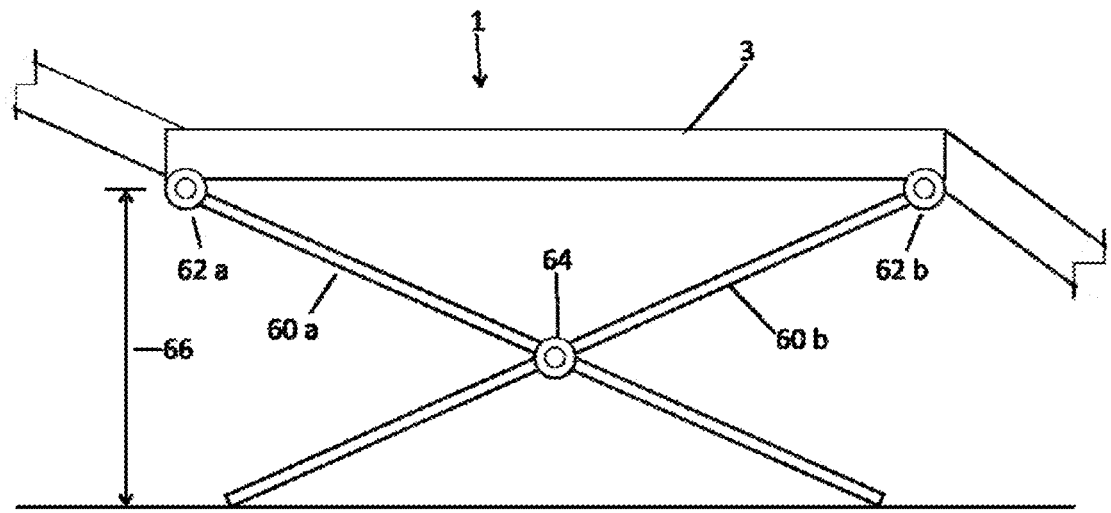
FIG. 10 is an elevation view of the pivoting section ground support structure, according to an embodiment.

FIG. 10 shows an embodiment of the pivot structure 3 supporting structures. In this embodiment, the pivot structure 3 ground support can be provided by folding cross supports 60a and 60b. Folding cross supports 60a and 60b attach to the underside of pivot structure 3 at support hinges 62a and 62b. Support hinges 62a and 62b allow folding cross supports 60a and 60b to lie flat against the underside of pivot structure 3 when pivoting delivery ramp 1 is not in use. Intersection lock 64 is a quick release fixation device that is located at the intersection of folding cross supports 60a and 60b. When pivoting delivery ramp 1 is in operational mode, intersection lock 64 engages with folding cross supports 60a and 60b and fixes them together when the desired support height 17 is reached. It follows that the desired support height 17 is directly related to the location where the user decides to fix intersection lock 64 on folding cross supports 60a and 60b. In operation, intersection lock 64 is designed to allow motion in one direction and engage locking function in the other and is oriented in a manner that allows an increase of support height 17 but then restricts the decrease in height unless manually unlocked by the user. In another embodiment, the ground support can be provided by folding cross supports.

Figure 11:
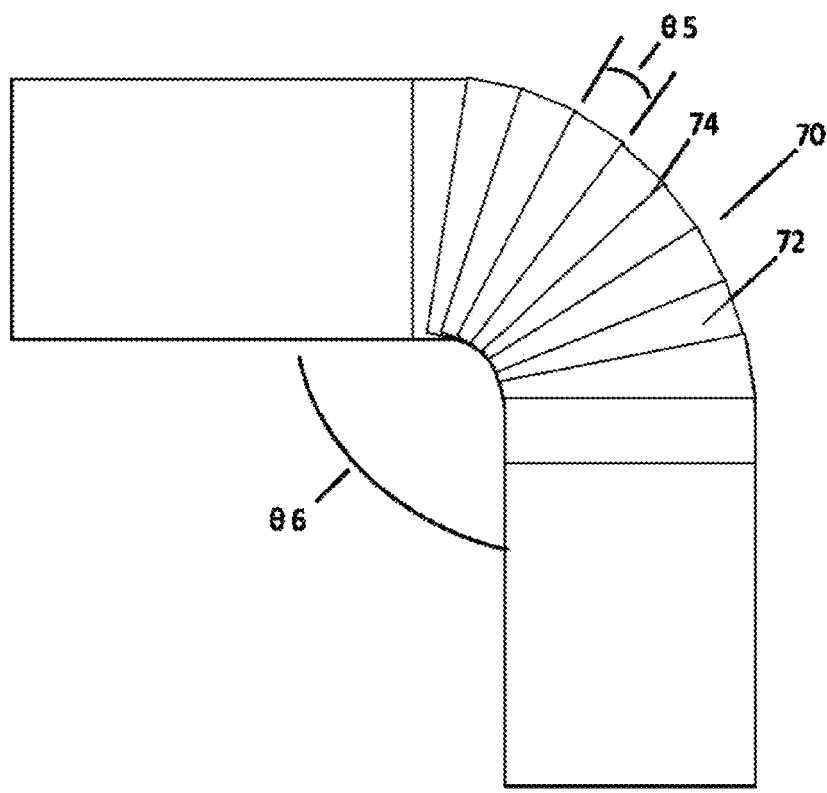
FIG. 11 is a top plan view of the accordion type pivoting section, according to an embodiment.

FIG. 11 shows an embodiment of pivot structure 3 where the pivoting action is accomplished by pivot plate section 70. Pivot plate section 70 comprises a plurality of pivot plates 72. The pivot plates 72 are sequentially connected. A pivot joint 74 is located at the intersection of upper ramp portion 7 and one end of the pivot plate section 70. A pivot joint 74 is also located at the intersection of lower ramp portion 9 and the other end of the pivot plate section 70, and between each pivot plate 72 within pivot plate section 70. Each pivot joint 74 provides a small amount of angular motion $\theta 5$. In sum, the angular motions $\theta 5$ create the cumulative range of motion represented by a pivoting range of motion θ6. Note that the pivoting range of motion θ6 is related to the angular motion θ5 in that the pivoting range of motion θ6 is equal to 180 degrees less the summation of all angular motions θ5 present in the pivot plate section 70. This pivoting section embodiment provides a less expensive alternative to other embodiments due to its simple components yet still provides rotational adjustability of other embodiments of pivot structure 3.

Figure 12:
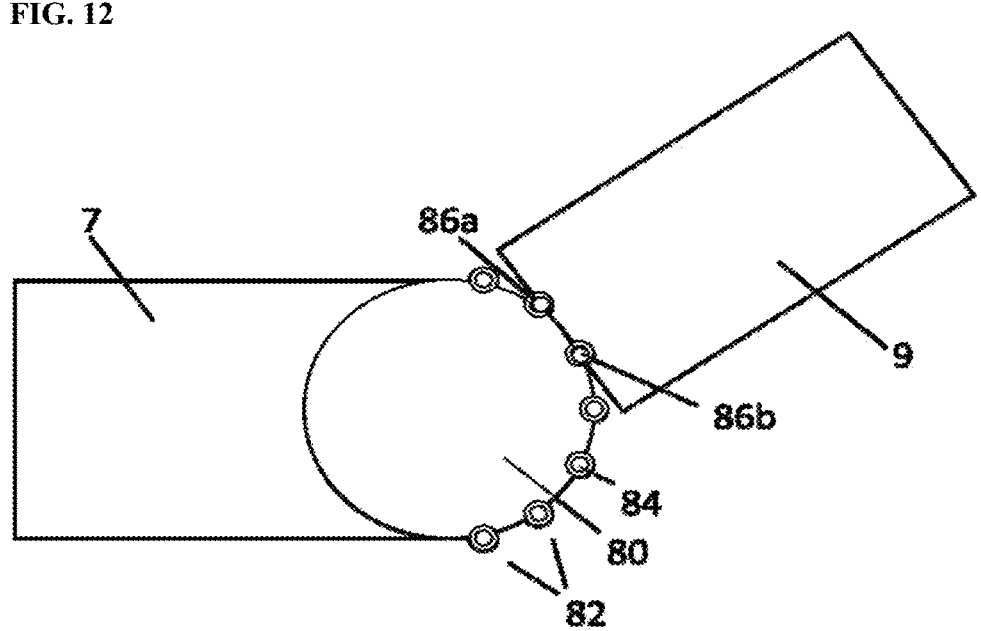
FIG. 12 is a top plan view of a peg and slot style pivoting section, according to an embodiment.

FIG. 12 shows an alternative embodiment that decouples upper ramp portion 7 and lower ramp portion 9. The upper ramp portion 7 now utilizes a stationary slot deck 80 at the second end opposite the first end which engages truck delivery bed 2. Stationary slot deck 80 comprises a flat platform with a circular array 82 of slots 84 that are located on the outer perimeter of stationary slot deck 80. Two pegs 86*a* and 86*b* are located at the first end of lower ramp portion 7. The space between pegs 86*a* and 86*b* is equal to the distance between two sequentially located slots 84 on stationary slot deck 80. This embodiment of pivoting delivery ramp 1 trades the ease at which the user can rotate aforementioned embodiments of the pivoting delivery ramp 1 for a less expensive, very low maintenance version. For illustrative purposes, one possible procedure of operation would entail the user to first set in place the upper ramp portion 7, then move lower ramp portion 9 into the desired position. Then the user would line up pegs 86*a* and 86*b* of lower ramp portion 9 with two slots 84 of the circular array 82 that are associated with the desired lower ramp portion 9 position. The user can then lower pegs 86*a* and 86*b* into the desired two slots 84 effectively securing lower ramp portion 9 in a desired position in relation to upper ramp portion 7.

Figure 13:
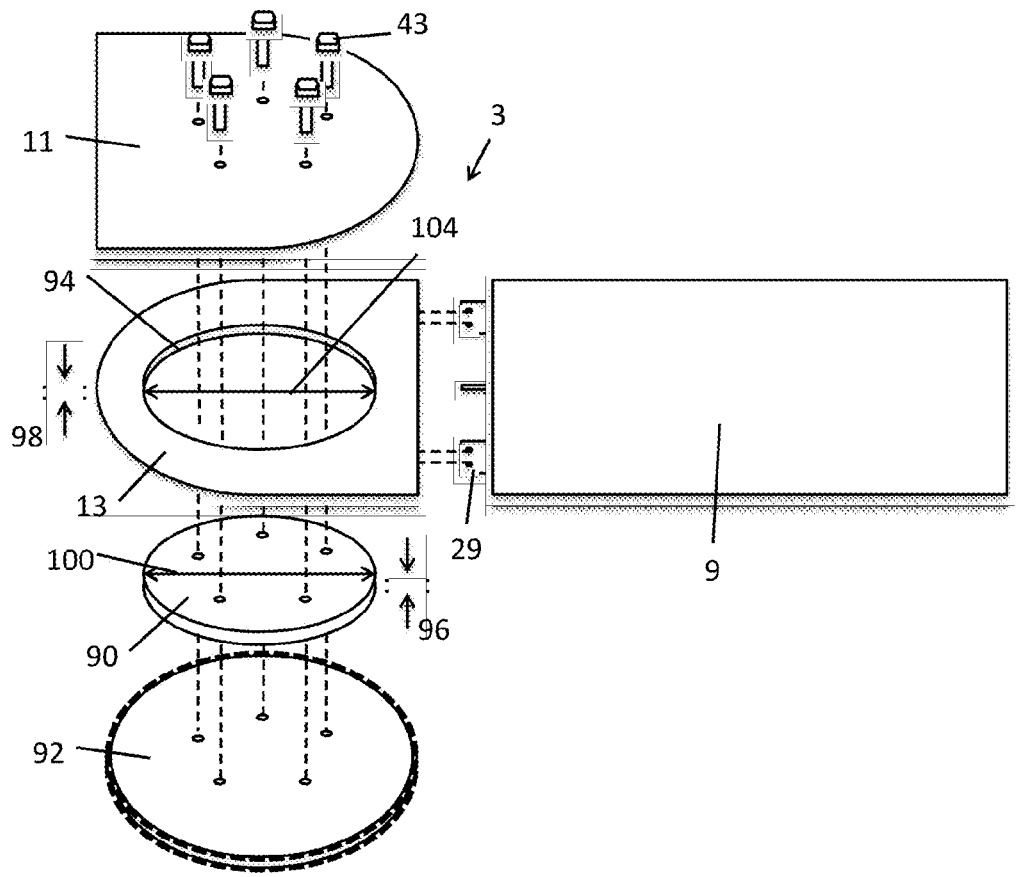
FIG. 13 is an exploded view of the pivoting structure, according to an embodiment.

In another embodiment, as shown in FIG. 13, the pivoting structure 3 comprises four main flat segments, in the lowest cost embodiment. In this embodiment, the pivot structure 3 comprises a spacer disk 90, which is coupled to stationary segment 11 on one side and lock disc 92 the other side. Fixation can be provided by a plurality of bolts 43 coupling stationary segment 11, spacer disc 90, and lock disc 92. Pivot opening 94 of rotation segment 13, in this embodiment, fully encapsulates spacer disc 90 and functionally rotates about spacer disk 90 providing pivoting movement of rotation segment 13 and lower ramp portion 9 with respect to stationary segment 11 and truck loading bed 2 (not shown in this embodiment). In this embodiment, spacer disc 90 is designed to have a spacer thickness 96 that is always greater than rotation segment thickness 98 of rotation segment 13 to ensure that there is free movement of rotation segment 13 with respect to stationary segment 11. Similarly, spacer disc 90 is designed to have a spacer diameter 100 that is always less than pivot opening diameter 104 of pivot opening 94. Lower ramp portion 9 attaches to rotation segment 13 via lower pivot hinge 29.

Note that in this embodiment, variable length support structure 16 can be attached to lock disc 92, stationary segment 11, or some other non pivoting entity of the embodiment. If attached to any pivoting entity of the embodiment, variable length support structure 16 would have a tendency to buckle when pivoting the rotation segment 13 due to transverse motion. Transverse motion due to pivoting could be accounted for, however, if distal end of variable length support structure 16 is supported by a low-friction or rolling device to interface with unloading surface 6.

Figure 14:
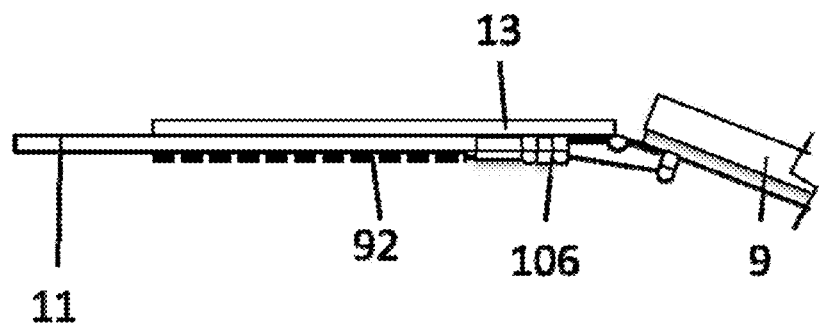
FIG. 14 is an elevation view of the pivoting structure, according to an embodiment.
Figure 15:
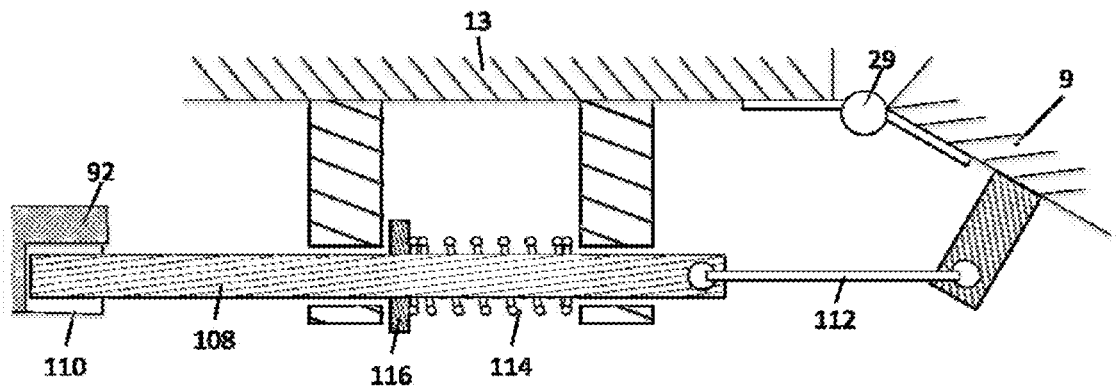
FIG. 15 is a cross-section view of the locking mechanism, according to an embodiment
Figure 16:
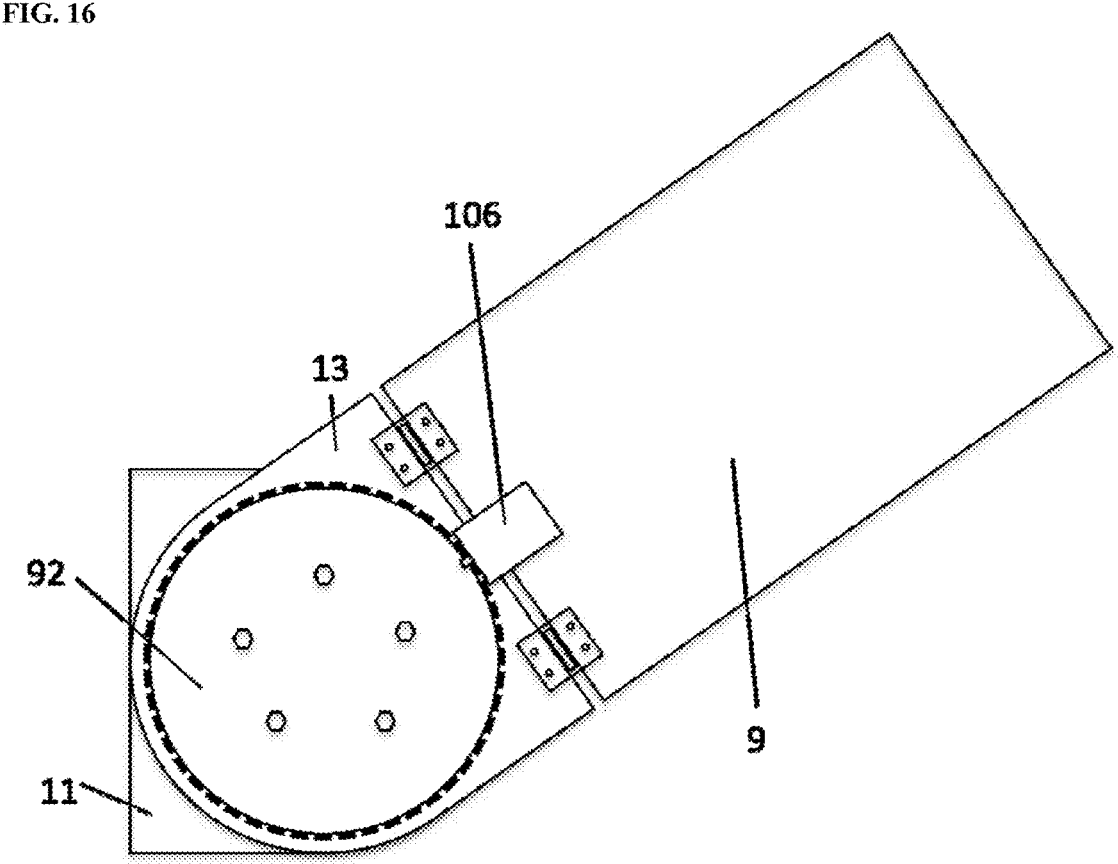
FIG. 16 is a bottom plan view of a pivoting delivery ramp, according to an embodiment.

FIG. 14 and FIG. 15 show, in greater detail, the locking mechanism 106 of the embodiment shown in FIG. 13. When the pivoting delivery ramp 1 is in operation and lower ramp portion 9 is resting on the unloading surface 6 (not shown in this embodiment), lock shaft 108 is engaged in a desired detent 110 of lock disc 92. When lower ramp portion 9 is being adjusted to a desired position, the action of lifting the end of lower ramp portion 9 pulls lock shaft 108 out of the detent 110, enabling rotation between stationary segment 11 and rotation segment 13. As lower ramp portion 9 rotates about lower pivot hinge 29 when lower ramp portion 9 is being lifted or lowered by the user, connecting wire 112 transmits the rotational motion into the horizontal motion needed to actuate lock shaft 108 in and out of the detents 110 of lock disc 92. In other embodiments, connecting wire 112 may be traced through a cam system or similar in order to increase the magnitude of the horizontal motion transferred from the rotation about lower pivot hinge 29. To ensure a locking bias, spring 114 provides continuous spring force on lock shaft 108 at lock shaft shoulder 116 in the direction in which the lock shaft 108 engages with detent 110. In this embodiment, pivotal locking is provided by a mechanism that engages and disengages by means of the user's action of lifting the lower ramp portion 9. Locking mechanism 106 is advantageous in that this action is an inherent and required action already necessary in the function of pivoting delivery ramp 1, thus providing a critical locking benefit with no extra user activity. However, if costs are prohibitive, this locking mechanism can easily be operated by hand. The locking mechanism could be fully shrouded, as shown in FIG. 16, to protect the mechanism from the elements.

Figure 17:
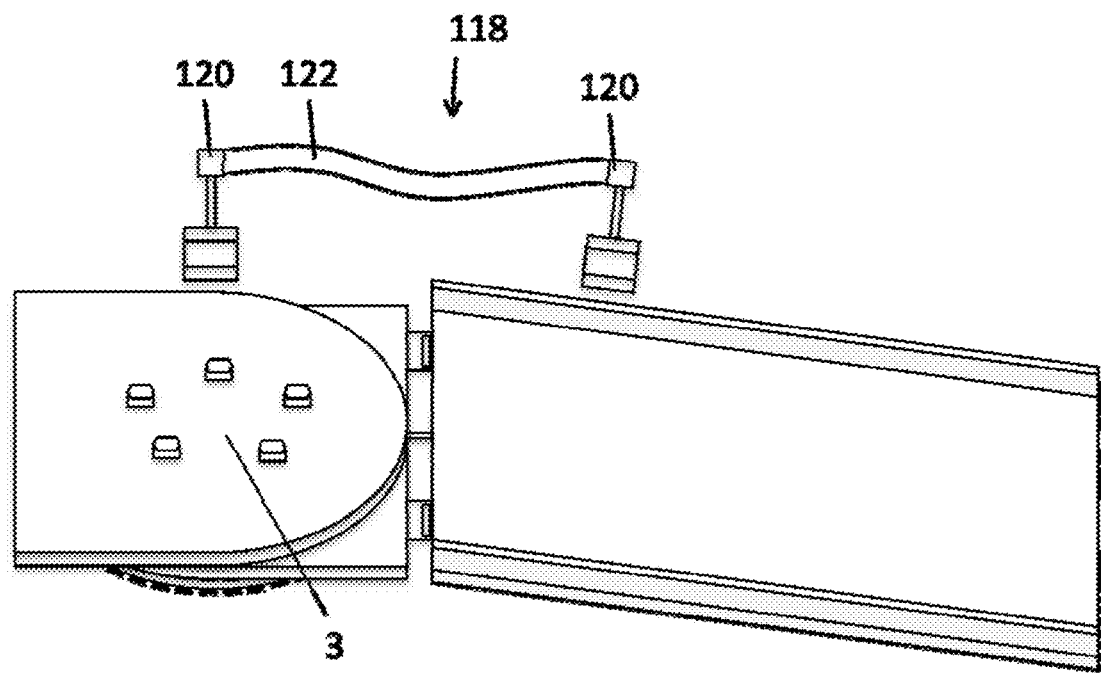
FIG. 17 is a perspective view of a safety barrier system for a pivoting delivery ramp, according to an embodiment.

FIG. 17 shows an embodiment of a safety barrier system 118. In the pivoting delivery ramp 1 and conventional ramps, people or products can fall off the sides during operation and a safety device can be implemented to guard against this danger. A rigid wall is utilized for this reason in conventional ramps, but a rigid wall would hinder the pivoting function of the pivoting structure 3. To solve this issue, the safety barrier system 118 includes two barrier posts 120, which clamp directly to the side of the pivoting structure 3 and the side of the lower ramp portion 9, respectively. Once fixed to the ramp at the predetermined locations, a retractable belt 122 is secured between the two barrier posts 120. The retractable belt 122 acts as a ramp path boundary to aid in keeping the user and delivery material on the ramp. The safety barrier system 118 could be removable to aide in compact storage.

Figure 18:
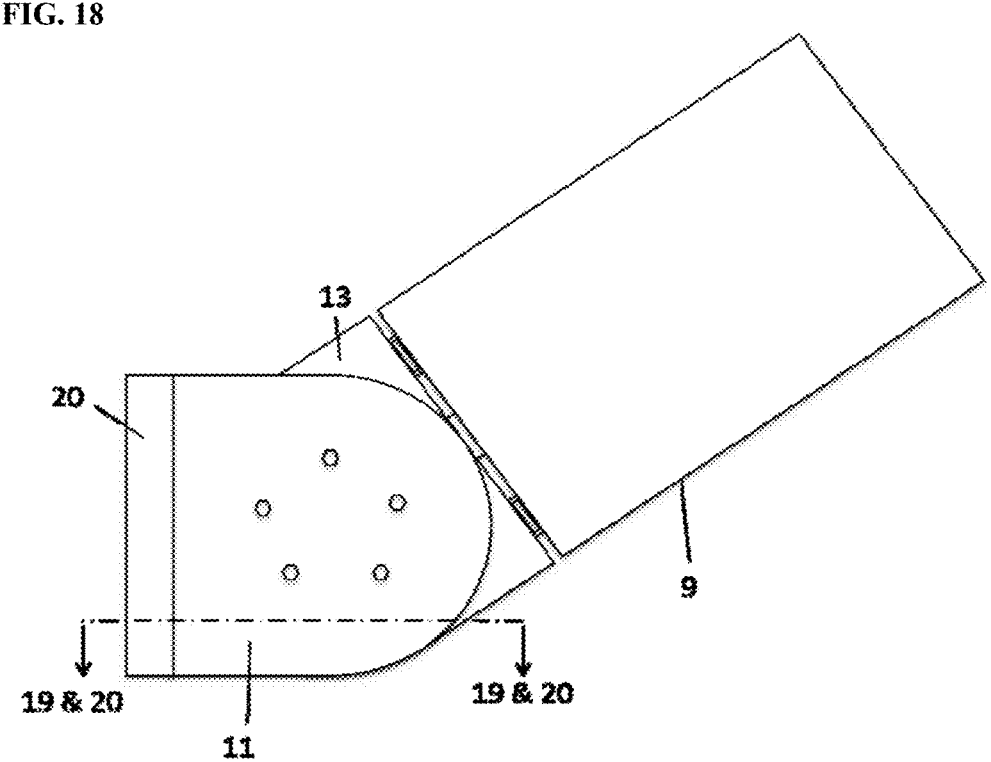
FIG. 18 is a top plan view of a pivoting delivery ramp.
Figure 19A:
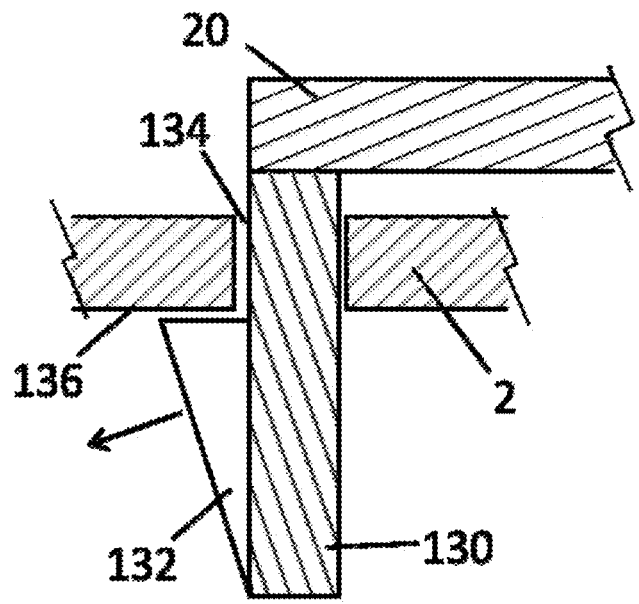
FIGS. 19a and 19b are cross-section views of the expanding attachment hooks in engaged and disengaged orientation respectively.
Figure 19B:
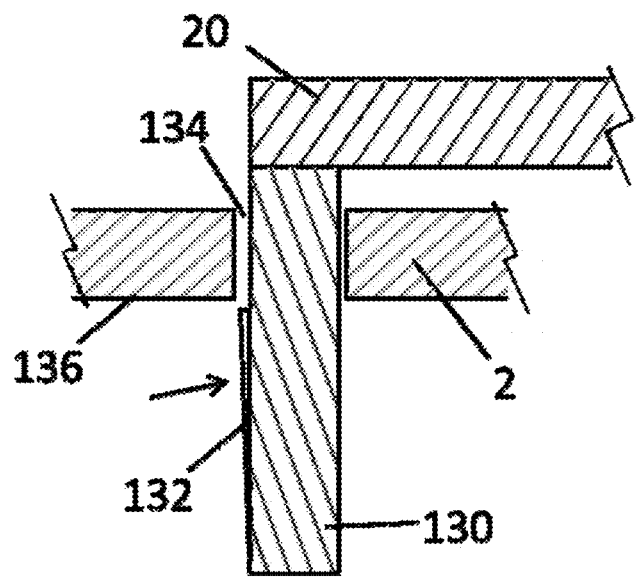

In some embodiments, truck engagement lip 20, upper ramp portion 7 or stationary segment 11 provides for direct fixation to standard hook recesses found on conventional truck loading beds. However, in embodiments where a torsion moment is created about the upper fixation points of the variable length support structures 16 during use, the truck engagement lip 20, upper ramp portion 7 or stationary segment 11 tends to lift upward disengaging from the standard hook recesses of truck loading bed 2. Therefore, additional fixation is needed beyond the means conventionally seen in ramp attachment hooks. FIG. 18, FIG. 19*a* and FIG. 19*b* show one embodiment of the truck engagement lip 20 further incorporating expanding hook 130 in engaged and disengaged orientation, respectively. Note that in this embodiment, upper ramp portion 7 is eliminated in favor of a stationary segment 11 that extends directly to the truck loading bed 2 and couples to the truck via truck engagement lip 20. Expanding hook 130 incorporates hook wedge 132 such that hook wedge 132 allows expanding hook 130 to freely enter a standard hook recess 134 of truck loading bed 2. Once the expanding hook 130 enters the standard hook recess 134 and clears recess lower edge 136, hook wedge 132 automatically expands via spring force (not shown in this embodiment). Hook wedge 132 then creates a positive mechanical stop such that expanding hook 130 cannot exit the standard hook recess 134 without disengaging mechanism (not shown in this embodiment) which overrides the aforementioned spring force and retracts hook wedge 132.

Figure 20:
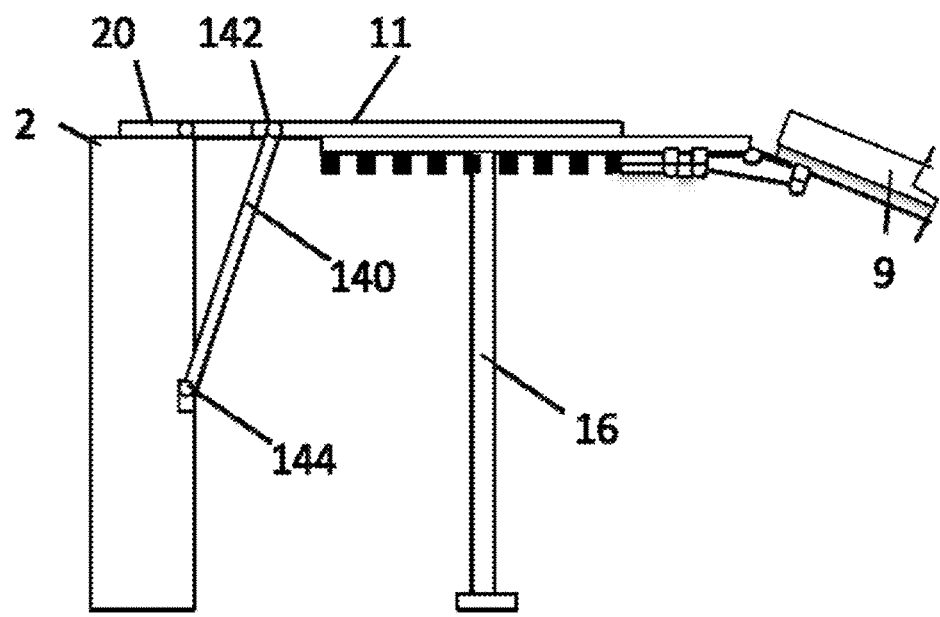
FIG. 20 is an elevation view of the pivoting structure emphasizing truck fixture components.

Alternatively, or in addition to, expanding hook 130, truck bed fastener 140, shown in FIG. 20, accomplishes the same goal of eliminating upward disengagement of truck engagement lip 20, stationary segment 11, or upper ramp portion 7. Truck bed fastener 140 couples, at one end, to stationary segment 11 at ramp fastener attachment point 142 located between the points where truck engagement lip 20 couples to stationary segment 11 and where variable length support structure 16 couples to stationary segment 11. In any alternative embodiment, the ramp fastener attachment point 142 can be located such that, in operation, it provides an equal and opposite torsion moment to any torsion moment created by loading lower ramp portion 9. At the opposite end of truck bed fastener 140, a truck fastener attachment point 144 couples to any structurally suitable point on a truck. Truck bed fastener 140 could be configured to couple to a conventional and standardized truck structure or, alternatively or in addition to, truck bed fastener 140 could provide for fixation to various types of attachment points on a truck.

Skid way portions of the pivoting delivery ramp 1 described herein can incorporate basic safety features of conventional loading ramps. The skid way is defined as any flat section of a ramp that the user directly walks on and/or moves cargo on. In embodiments, skid way portions of the pivoting delivery ramp 1 can incorporate high friction surfaces. These high friction surfaces might include a grit finish, grit paper, ribs, diamond plate, or other various anti-slip features. The skid ways would also have side structures, such as side ribs, to ensure that the cargo stays within the confines of the skid way and does not fall off the sides. Some embodiments can collapse and either slide into an integrated track in the truck or fit in the cargo area using as little space as possible.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112(f) of 35 U.S.C. are not to be invoked unless the specific terms "means for" or "step for" are recited in a claim.

I claim:

1. A ramp device comprising:
    a first ramp portion including:
        a first coupler arranged at a first end of the first ramp element and configured to be coupleable to a structure;
        a hinge arranged at a second end of the first ramp element, the second end being opposite from the first end of the first ramp element, the hinge having a first axis of rotation;
    a second ramp portion including a third coupler arranged at a first end of the second ramp element, the third coupler having a second axis of rotation that is substantially parallel to the first axis of rotation, the first end of the second ramp element being opposite a second end of the second ramp element that is configured to be supported by adjacent surface; and
    a pivoting structure including:
        a first segment mechanically coupled to the first ramp element by the hinge,
        a pivot segment mechanically fixed to the first segment, the pivot segment including:
            an upper portion having a circumference,
            a lower portion having a circumference, and
            an inner spool portion having a circular cross-section and defining a circumference,
            wherein the inner spool portion is arranged between the upper portion and the lower portion, and
            wherein the circumference of the inner spool portion is smaller than either of the circumference of the upper portion and the circumference of the lower portion; and
        a second segment having a pivot extrusion that extends around the circumference of the inner spool portion, configured such that the second segment can smoothly rotate about the pivot segment about a third axis of rotation that is orthogonal to the first axis.

2. The device of claim 1, wherein the pivoting structure further comprises at least one variable length ground support structure.

3. The device of claim 1, wherein the pivoting structure further comprises at least one rotational locking structure comprising:
    a plurality of detents in the lower portion of the pivot segment; and a lock shaft configured to engage with one or more of the detents to selectively prevent rotation of the second segment about the pivot segment.

4. The device of claim 1, wherein the first coupler further comprises:
a truck engagement lip that couples to the truck and includes a lip hinge comprising an axis of rotation of the lip hinge is substantially orthogonal to the third axis of rotation.

5. The device of claim 1, wherein the hinge of the first ramp portion further comprises an upper pivot hinge comprising an axis of rotation substantially orthogonal to the third axis of rotation, wherein the upper pivot hinge comprises angle locks.

6. The device of claim 1, wherein the third coupler of the second ramp portion further comprises a lower pivot hinge including an axis of rotation substantially orthogonal to the third axis of rotation, wherein the lower pivot hinge includes angle locks.

7. A truck with a ramp device comprising:
a loading bed configured to engage with the truck;
a ramp section including:
a first ramp portion including:
a first coupler arranged at a first end of the first ramp element and configured to be coupleable to the truck;
a hinge arranged at a second end of the first ramp element, the second end being opposite from the first end of the first ramp element, the hinge having a first axis of rotation;
a second ramp portion including a third coupler arranged at a first end of the second ramp element, the third coupler having a second axis of rotation that is substantially parallel to the first axis of rotation, the first end of the second ramp element being opposite a second end of the second ramp element that is configured to be supported by adjacent surface; and
a pivoting structure including:
a first segment mechanically coupled to the first ramp element by the hinge,
a pivot segment mechanically fixed to the first segment, the pivot segment including:
an upper portion having a circumference,
a lower portion having a circumference, and
an inner spool portion having a circular cross-section and defining a circumference,
wherein the inner spool portion is arranged between the upper portion and the lower portion, and
wherein the circumference of the inner spool portion is smaller than either of the circumference of the upper portion and the circumference of the lower portion; and
a second segment having a pivot extrusion that extends around the circumference of the inner spool portion, configured such that the second segment can smoothly rotate about the pivot segment about a third axis of rotation that is orthogonal to the first axis.

8. The device of claim 7, wherein the pivoting structure further comprises at least one variable length ground support structures.

9. The device of claim 7, wherein the pivoting structure further comprises at least one rotational locking structures comprising:
a plurality of detents in the lower portion of the pivot segment; and
a lock shaft configured to engage with one or more of the detents to selectively prevent rotation of the second segment about the pivot segment.

10. The device of claim 7, wherein the first coupler of the first ramp portion further comprises a truck engagement lip that couples to the truck and includes a lip hinge comprising an axis of rotation of the lip hinge is substantially orthogonal to the third axis of rotation.

11. The device of claim 7, wherein the hinge of the first ramp portion further comprises an upper pivot hinge comprising an axis of rotation substantially orthogonal to the third axis of rotation, wherein the upper pivot hinge comprises angle locks.

12. The device of claim 7, wherein the third coupler of the second ramp portion further comprises a lower pivot hinge comprising an axis of rotation substantially orthogonal to the third axis of rotation, wherein the lower pivot hinge comprises angle locks.

13. A device for use with a truck, the device comprising:
a pivoting structure including:
a first segment mechanically coupled to the truck,
a pivot segment mechanically fixed to the first segment, the pivot segment including:
an upper portion having a circumference,
a lower portion having a circumference, and
an inner spool portion having a circular cross-section and defining a circumference,
wherein the inner spool nation is arranged between the upper portion and the lower portion, and
wherein the circumference of the inner spool portion is smaller than either of the circumference of the upper portion and the circumference of the lower portion; and
a second segment having a pivot extrusion that extends around the circumference of the inner spool portion, configured such that the second segment can smoothly rotate about the pivot segment about a first axis; and
a ramp comprising a coupler connecting a first end of the ramp and the second segment, the coupler comprising a second axis of rotation that is substantially orthogonal to the first axis.

14. The device of claim 13, wherein the pivoting structure further comprises a plurality of variable length ground support structures.

15. The device of claim 13, wherein the pivoting structure further comprises a plurality of rotational locking structures comprising:
a plurality of detents in the lower portion of the pivot segment; and
a lock shaft configured to engage with one or more of the detents to selectively prevent rotation of the second segment about the pivot segment.

16. The device of claim 13, wherein the coupler of the first end of the ramp element further comprises a hinge having an axis of rotation substantially orthogonal to the axis of rotation of the pivoting structure and wherein the hinge includes angle locks.

17. The device of claim 13, wherein a removable safety siding attaches to various locations of the pivoting structure at one end and to various locations of the ramp element at the other end.

18. The device of claim 13, further comprising at least two folding cross supports mechanically coupled to the pivot segment, and mechanically coupled to one another at an intersection lock, wherein the folding cross supports are configured to fold against the pivot segment or unfold to a fixed configuration.

19. The device of claim 13, further comprising a hook wedge having a spring, the spring configured to bias the hook wedge and cause engagement of the hook wedge with a recess edge of the truck in the absence of a sufficient compression level of the spring.

* * * * *

UNITED STATES PATENT AND TRADEMARK OFFICE
CERTIFICATE OF CORRECTION

PATENT NO. : 9,694,997 B2  
APPLICATION NO. : 14/990549  
DATED : July 4, 2017  
INVENTOR(S) : Lopez Page 1 of 1

It is certified that error appears in the above-identified patent and that said Letters Patent is hereby corrected as shown below:

In the Claims

Column 12, Line 25, please correct Claim 13 as follows:
--- wherein the inner spool portion is arranged between ---

Signed and Sealed this
Twenty-fourth Day of July, 2018

Andrei Iancu
*Director of the United States Patent and Trademark Office*